United States Patent
Mahmoud et al.

(10) Patent No.: US 10,138,411 B1
(45) Date of Patent: *Nov. 27, 2018

(54) DIRECTIONAL DRILLING AND CAPSULE FLOODING PROCESS FOR RECOVERING HYDROCARBONS

(71) Applicant: KING FAHD UNIVERSITY OF PETROLEUM AND MINERALS, Dhahran (SA)

(72) Inventors: Mohamed A. Mahmoud, Dhahran (SA); Mir Muhammad Mansoor Alam, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/102,261

(22) Filed: Aug. 13, 2018

Related U.S. Application Data

(63) Continuation of application No. 15/963,253, filed on Apr. 26, 2018, which is a continuation of application No. 14/824,395, filed on Aug. 12, 2015, now Pat. No. 9,976,071.

(51) Int. Cl.
*C09K 8/58* (2006.01)
*C09K 8/594* (2006.01)
*E21B 43/16* (2006.01)
*C09K 8/72* (2006.01)

(52) U.S. Cl.
CPC .............. *C09K 8/58* (2013.01); *C09K 8/594* (2013.01); *E21B 43/164* (2013.01)

(58) Field of Classification Search
None
See application file for complete search history.

(56) References Cited

U.S. PATENT DOCUMENTS

| | | |
|---|---|---|
| 4,523,642 A | 6/1985 | Venkatesan |
| 6,279,656 B1 | 8/2001 | Sinclair |
| 6,444,316 B1 | 9/2002 | Reddy et al. |
| 7,642,223 B2 | 1/2010 | Santra et al. |
| 8,235,110 B2 | 8/2012 | Larter et al. |
| 2007/0114033 A1 | 5/2007 | Hermes et al. |
| 2008/0078547 A1 | 4/2008 | Sinclair |
| 2010/0012331 A1 | 1/2010 | Larter |

(Continued)

OTHER PUBLICATIONS

"Nanocapsule," Wikipedia, 8 Pages, Accessed on Apr. 10, 2017, https://en.wikipedia.org/w/index.php?title=Nanocapsule&oldid=756010170.

*Primary Examiner* — Angela M DiTrani Leff
*Assistant Examiner* — Charles R Nold
(74) *Attorney, Agent, or Firm* — Oblon, McClelland, Maier & Neustadt, L.L.P.

(57) ABSTRACT

Oil recovery processes from carbonate or sandstone reservoirs. With a carbonate reservoir, the reservoir is initially flooded with a fluid such as sea water. Then the same fluid containing a plurality of citric acid-filled microcapsules is injected into the reservoir. These microcapsules are left to incubate in the reservoir, which will then infiltrate the rock formations, degrade by heat and release the encapsulated citric acid. The released citric acid reacts with the carbonate rocks to produce $CO_2$ in situ, which causes oil trapped in the rock formations to swell, reduce in viscosity and move towards to a nearby production well. For a sandstone reservoir, calcium carbonate can be also encapsulated with the citric acid for $CO_2$ generation at the reservoir.

7 Claims, 5 Drawing Sheets

(56) References Cited

U.S. PATENT DOCUMENTS

| | | |
|---|---|---|
| 2013/0161005 A1 | 6/2013 | Yates |
| 2013/0264060 A1 | 10/2013 | De Wolf |
| 2013/0341022 A1 | 12/2013 | Nguyen |
| 2014/0020898 A1 | 1/2014 | Holderman |
| 2014/0231080 A1 | 8/2014 | Sanders et al. |
| 2015/0068746 A1 | 3/2015 | Abass |
| 2015/0129213 A1 | 5/2015 | Szabo |
| 2015/0330197 A1 | 11/2015 | Brannon |
| 2015/0344772 A1 | 12/2015 | Droger |
| 2016/0017215 A1 | 1/2016 | Al-Muntasheri |
| 2016/0032174 A1 | 2/2016 | Fuller |
| 2016/0115364 A1 | 4/2016 | Braley |
| 2016/0340569 A1 | 11/2016 | Belcher |
| 2017/0143558 A1 | 5/2017 | Joseph |

DIRECTIONAL DRILLING AND CAPSULE FLOODING PROCESS FOR RECOVERING HYDROCARBONS

CROSS-REFERENCE TO RELATED APPLICATIONS

The present application is a Continuation of Ser. No. 15/963,253, now allowed, having a filing date of Apr. 26, 2018 which is a Continuation of Ser. No. 14/824,395, now U.S. Pat. No. 9,976,071, having a filing date of Aug. 12, 2015.

BACKGROUND OF THE INVENTION

Technical Field

The present invention relates to processes and techniques for crude oil recovery. More specifically, the present invention relates to processes for enhancing in situ generation of carbon dioxide in an oil reservoir that in turn results in increased oil recovery.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crude oil development and production in global oil reservoirs can include up to three distinct phases: primary, secondary and tertiary (or enhanced) recovery. During primary recovery, reservoir drive comes from a number of natural mechanisms. These include: natural water displacing oil downward into the well, expansion of the natural gas at the top of the reservoir, expansion of gas initially dissolved in the crude oil, and gravity drainage resulting from the movement of oil within the reservoir from the upper to the lower parts where production wells are located. Only about 10% (e.g. 5-15%) of a reservoir's original oil in place is typically produced by the natural mechanisms of primary recovery. Secondary techniques extend a field's productive life after the natural reservoir drive diminishes, generally by injecting external energy in the form of water (e.g. water injection or waterflooding) or gas to increase the reservoir pressure, so that the oil can be artificially displaced and driven to a production wellbore, resulting in the recovery of 20-40% of the original oil in place.

As global energy demand continues to surge and the amount of easy-to-produce oil (by primary and secondary recoveries) diminishes rapidly, oil producers are investing and searching for methods to increase oil recovery, including the recovery of residual oil from a growing number of mature oil fields that have already been subjected to primary and secondary recoveries. The residual oil is usually heavy: having high viscosity and therefore resulting in low oil mobility.

Techniques in enhanced oil recovery (EOR) offer prospects for ultimately producing 30-60%, or more, of the reservoir's original oil in place. EOR processes attempt increase the recovery factor by focusing on the rock/oil/injectant system (e.g. wettability of reservoir rocks) as well as the interplay of capillary and viscous forces (i.e. to reduce the viscosity and thereby increase the mobility of the oil especially the residual oil). Three major categories of EOR have been found to be commercially viable to varying degrees: thermal recovery, gas injection (e.g. natural gas, $N_2$ or $CO_2$) and chemical injection (e.g. polymer flooding and microbial injection).

The EOR technique that has attracted the most new market interest is $CO_2$-EOR. In the U.S., $CO_2$ injection has been implemented through the Permian Basin of West Texas and eastern New Mexico, and is now also being pursued at varying extents in other states such as Kansas, Mississippi, Wyoming, Oklahoma, Colorado, Utah, Montana, Alaska and Pennsylvania.

$CO_2$ is effective in recovering oil from a reservoir because it promotes swelling of the oil, reduces the viscosity and vaporizes portions of crude oil as it is being transported through the porous rock. However, as $CO_2$ is highly mobile, this technique encounters problems of viscous fingering, reservoir heterogeneity and gravity overriding or segregation, as the ability to control the mobility of $CO_2$ is limited.

Attempts to reduce the mobility of $CO_2$ include in situ generation of $CO_2$ in oil reservoirs and injection of $CO_2$ in a supercritical fluid state or as carbonated water. These strategies can also be accompanied by the injection of chemicals such as viscosifiers, surfactants and nanosilica particles for foam formation.

US 2014/0338903A1 describes the use of HEDTA chelating agents at low pH values to generate $CO_2$ in situ in carbonate cores. This method is good for in situ $CO_2$ generation at near wellbore regions but not for deep placement and maximum contact with the reservoir as the HEDTA or any low pH chemical, having no retarding mechanisms for their reaction, will be consumed at the reservoir.

Gumersky et al. uses a gas-forming solution containing water and a mixture of low concentrated acid and low concentrated surfactant and polymer. The solution forms a stable foam and while penetrating through barrier-blocking high permeable layers and into low permeable layers, the gas-forming solution shows visco-elastic properties and displaces oil from them. This method improved water flooding efficiency by 20-30% and the ultimate oil recovery improved marginally by 3-5% compared to traditional water flooding [Gumersky, K., Dzhafarov, I. S., Shakhverdiev, A. K. and Mamedov, Yu. G. 2000. In-Situ Generation of Carbon Dioxide: New Way to Increase Oil Recovery. Paper SPE 65170-MS presented at SPE European Petroleum Conference, Paris, France, 24-25 Oct. 2000—incorporated herein by reference in its entirety].

Shiau et al. heat ammonium carbamate above 85° C. to produce $CO_2$ which reduced oil viscosity and this ammonium carbamate when used with surfactant polymer chemical flood and an enhanced oil recovery of 9.7% was recorded [Shiau, B. J. B., Hsu, T.-P., Roberts, B. L., & Harwell, J. H. 2010. Improved Chemical Flood Efficiency by In Situ $CO_2$ Generation. Paper SPE 129893-MS presented at the SPE Improved Oil Recovery Symposium, 24-28 April, Tulsa, Okla., USA—incorporated herein by reference in its entirety].

Xiaofei et al. generate in situ $CO_2$ using active acid, polymer, and surfactant to solve the problem of reservoir heterogeneity and high water to oil viscosity ratio which results in monolayer and monodirectional flow. $CO_2$ flooding reduced injection pressure and effectively plugged channeling between injection-production wells. Their system increased the swept volume, increased oil, and decreased water cut [Xiaofei J., Kuiqian M., Yingxian L., Bin L., Jing, Z., and Yanlai L. 2013. Enhanced Heavy Oil Recovery by In-Situ Carbon Dioxide Generation and Application in China Offshore Oilfield. Paper SPE 165215 presented at The SPE Enhanced Oil Recovery Conference held in Kuala Lumpur, Malaysia, 2-4 Jul. 2013—incorporated herein by reference in its entirety].

U.S. Pat. No. 8,616,294 describes an apparatus for generating carbon dioxide gas in situ at an oil site for use in enhanced oil recovery (EOR). The apparatus includes a steam generator adapted to boil and superheat water to generate a source of superheated steam, as well as a source of essentially pure oxygen. The apparatus also includes a steam reformer adapted to allow the reaction of a carbonaceous material with the superheated steam and the pure oxygen, in an absence of air, to generate a driver gas comprising primarily carbon dioxide gas and hydrogen gas.

US 2014/0231080A1 describes use of acid and sodium bicarbonate to generate $CO_2$ in the wellbore itself but not the reservoir. The $CO_2$ that is generated in situ will increase the pressure inside the wellbore to lift the oil from the bore.

In view of the above, there remains an apparent need for in situ $CO_2$ generation systems and methods that can reach deep into oil reservoir and sustain the actual reservoir conditions. The present disclosure aims to provide a method having a different approach towards in situ generation of $CO_2$ in carbonate and sandstone reservoirs.

BRIEF SUMMARY OF THE INVENTION

According to a first aspect, the present disclosure pertains to a process for recovering hydrocarbon from a carbonate reservoir having a plurality of carbonate geologic formations. The process comprises initially flooding the carbonate reservoir with a first portion of a fluid to displace and recover a first portion of the hydrocarbon; injecting a dispersion into the carbonate reservoir, the dispersion comprising a second portion of the fluid and a plurality of citric acid-filled microcapsules; incubating the dispersion in the carbonate reservoir; and finally flooding the carbonate reservoir with a third portion of the fluid to displace and recover a second portion of the hydrocarbon. During the incubating, the dispersion infiltrates the plurality of carbonate geologic formations. The plurality of citric acid-filled microcapsules undergoes degradation and releases the citric acid. The released citric acid reacts with the carbonate geologic formations to generate carbon dioxide at the formations. The generated carbon dioxide contacts the second portion of the hydrocarbon, swells and reduces viscosity of the second portion of the hydrocarbon.

In some embodiments, the plurality of citric acid-filled microcapsules undergoes thermal physical degradation, thermal chemical degradation, or both.

In some embodiments, the initial flooding displaces and recovers up to 60% of original oil in place in the carbonate reservoir. The final flooding displaces and recovers a further 10-35% of original oil in place in the carbonate reservoir.

In certain embodiments, the citric acid-filled microcapsules are round and have a diameter range of 0.1-50 μm.

In one or more embodiments, the citric acid filled-microcapsules comprise an outer polymeric shell and an inner solid core material encapsulated by the outer polymeric shell. The inner solid core material comprises citric acid solid. In one embodiment, the outer polymeric shell has the following characteristics: water insoluble; non-porous; no greater than 2 μm in thickness; free of silicon, phosphorus, fluorine, bromine, chlorine and sulfur; and free of a chemical crosslinker.

In at least one embodiment, the inner solid core material comprises 1-20% of the citric acid solid per total weight of the citric acid-filled microcapsule.

In some embodiments, the inner solid core material further comprises 1-20% of one or more chelating agents per total weight of the citric acid-filled microcapsule. The one or more chelating agents are selected from ethylenediaminetetracetic acid (EDTA), (hydroxyethyl)ethylenediaminetriacetic acid (HEDTA), glutamic acid-N,N-diacetic acid (GLDA), methylglycine-N,N-diacetic acid (MGDA), nitrilotriacetic acid (NTA), hydroxyethyliminodiacetic acid (HEIDA), iminodisuccinic acid (IDS), polyaspartic acid and ethylenediamine-N,N-disuccinic acid (EDDS).

In certain embodiments, the dispersion has a density of $10^4$-$10^{12}$ citric acid filled-microcapsules per liter of the second portion of the fluid.

According to a second aspect, the present disclosure relates to a process for recovering hydrocarbon from a sandstone reservoir having a plurality of sandstone geologic formations where the injected microcapsules are filled with citric acid and calcium carbonate. Upon degradation of the microcapsules, the released citric acid and calcium carbonate react with each other to generate carbon dioxide at the sandstone geologic formations. The inner solid core material of the microcapsule comprises citric acid solid and calcium carbonate solid.

In certain embodiments, the inner solid core material comprises 1-20% of the citric acid solid per total weight of the microcapsule and 3-60% of the calcium carbonate solid per total weight of the microcapsule.

According to a third aspect, the present disclosure provides a microcapsule comprising an outer polymeric shell and an inner solid core material encapsulated by the outer polymeric shell. The outer polymeric shell has the following properties: water insoluble; non-porous; no greater than 2 μm in thickness; free of silicon, phosphorus, fluorine, bromine, chlorine and sulfur; and free of a chemical crosslinker. The inner solid core material comprises 1-20% of citric acid solid per total weight of the microcapsule and optionally 3-60% of calcium carbonate solid per total weight of the microcapsule.

In certain embodiments, the inner solid core material further comprises 1-20% of one or more the aforementioned chelating agents per total weight of the microcapsule.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
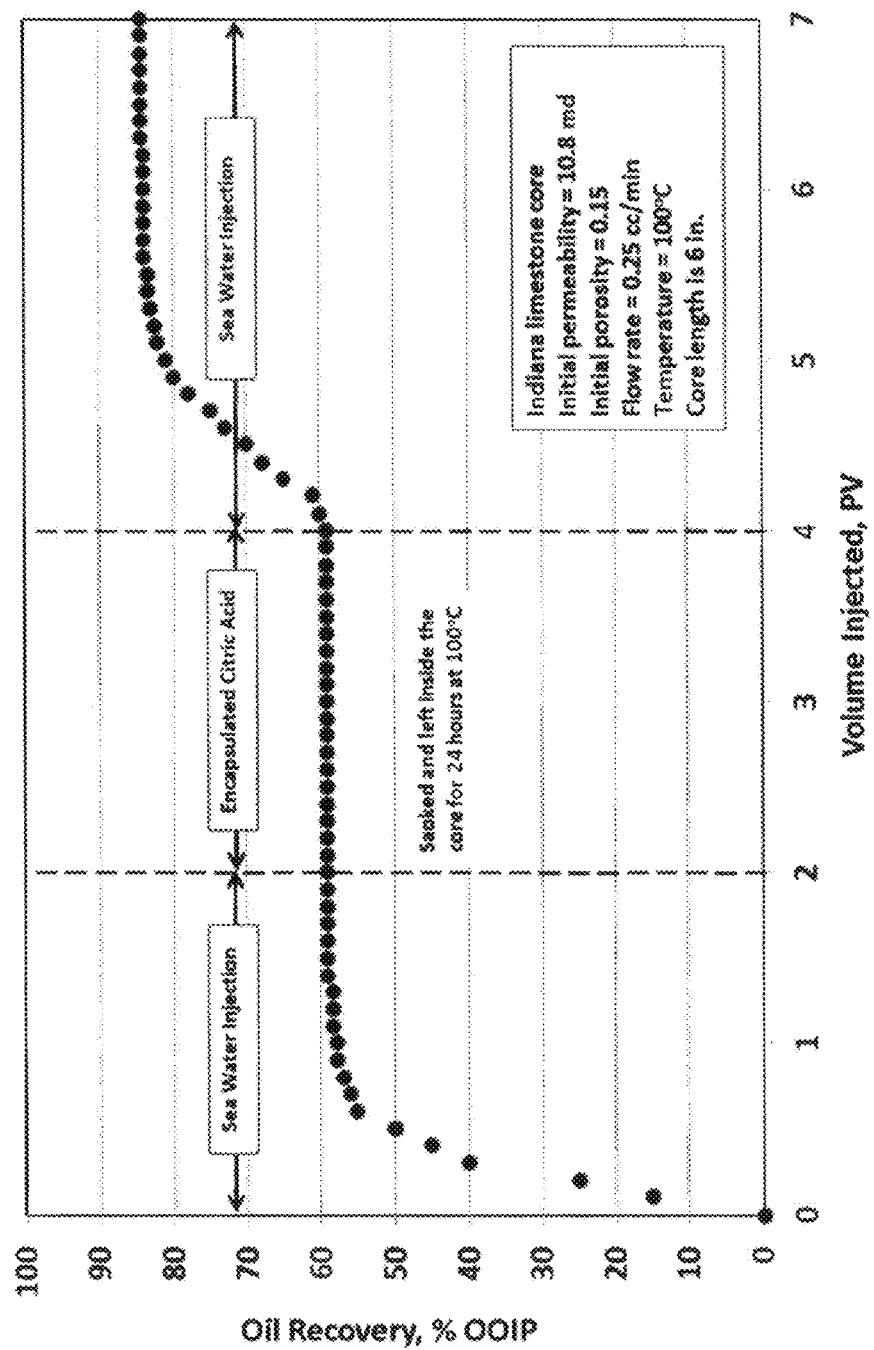
FIG. 1 is a curve showing oil recovery trend when 10 wt. % encapsulated citric acid is used on a 6-in Indiana limestone core.

Referring now to the drawings, wherein like reference numerals designate identical or corresponding parts throughout the several views.

The present disclosure will be better understood with reference to the following definitions:

For purposes of the present disclosure, the terms "reservoir", "oil reservoir" and "petroleum reservoir" refer to a component of a petroleum system (i.e. hydrocarbon or petroleum-generating and storing geologic system) that is composed of a subsurface body of rock formations having sufficient porosity and permeability to store and transmit fluids. Sedimentary rocks are the most common reservoir rocks because they have more porosity than most igneous and metamorphic rocks and form under temperature conditions at which hydrocarbons can be preserved. Depending on the type of sedimentary rock, reservoirs can be classified as carbonate reservoirs having predominantly limestones and sandstone reservoirs having primarily siliclastic rocks and clay. In general, carbonate reservoirs tend to have lower primary permeability and salinity compared to sandstone reservoirs.

For purposes of the present disclosure, the terms "bore" and "wellbore" refer to a drilled hole or borehole, including the open hole or uncased portion of the well. In some embodiments, a borehole refers to the inside diameter of the wellbore wall, the rock face that bounds the drilled hole.

For purposes of the present disclosure, the term "near wellbore" refers to an area or a region that is no more than 10 feet away from the wellbore, preferably 1-8 feet away, more preferably 2-6 feet away.

For purposes of the present disclosure, the term "permeability" refers to the ability, or measurement of a reservoir rock ability, to transmit fluids and is typically measured in darcies (d) or millidarcies (md). Formations that transmit fluids readily, such as sandstones, are described as permeable and tend to have many large, well-connected pores. Impermeable formations tend to be finer grained or of a mixed grain size, with smaller, fewer, or less interconnected pores. As used herein, a "low-permeability reservoir" refers to an oil reservoir having a range of permeability that is no higher than 10 md, preferably 0.05-10 md, more preferably 0.1-7.5 md, even more preferably 0.5-5 md, most preferably 1-5 md. Accordingly, as used herein a "high-permeability reservoir" refers to an oil reservoir having a range of permeability that is higher than 10 md.

For purposes of the present disclosure, the term "porosity" refers to the percentage or ratio of void space to the pore volume (PV) of a rock, or that total volume within the rock that can contain or hold fluids, which is typically no more than 20-25% for both sandstone and carbonate reservoirs. "Total porosity" is the total void space in the rock whether or not it contributes to fluid flow. Thus, effective porosity is typically less than total porosity.

For purposes of the present disclosure, the term "pore volume" refers to the total volume in a reservoir that can be occupied by fluids. This term is also used as a measurement unit referring to amount of fluid such as chemical fluid or water that is injected into a reservoir during secondary and tertiary recoveries.

For purposes of the present disclosure, the term "water injection" or "waterflooding" refers to a method of oil recovery in which water is injected into a petroleum reservoir to sweep and displace mobile oil. The water injected increases pressure within the reservoir, replenishing the natural reservoir pressure that has been previously depleted in primary recovery, and physically sweeps the displaced mobile oil to the adjacent production wells. Generally, the water or fluid used in a waterflooding process is taken from nearby water sources, and is usually natural sea water, fresh water, produced water (byproduct of the oil industry), aquifer water, river water, artificial saline water or brine. The water injected during waterflooding has a wide salinity range of 500-200,000 ppm, preferably 1,000-100,000 ppm, more preferably 2,500-75,000 ppm. Minerals contained in the saline solution include but are not limited to chloride, sodium, sulfate, magnesium, calcium, potassium, bicarbonate, carbonate, bromide, boron, strontium and fluoride. In the present disclosure, the water or fluid injected further acts as a medium for carrying the citric acid microcapsules to infiltrate reservoir rock formations and as an aqueous solvent for dissolving citric acid released from degraded capsules.

For purposes of the present disclosure, the term "thermal physical degradation" refers to a process whereby the action of heat or elevated temperature on a polymer that causes a change or loss of physical, mechanical and/or electrical properties.

For purposes of the present disclosure, the term "thermal decomposition" or "thermal chemical degradation" refers to a process of chemical species change in a polymer that is caused by heat, which involves scission of one or more covalent bonds such as but not limited to a carbon-carbon bond (single, double or triple), a carbon-hydrogen bond, a carbon-oxygen bond (single or double), a carbon-nitrogen bond, an ester bond and an amide bond.

For purposes of the present disclosure, the term "glass transition temperature" ($T_g$) refers to a temperature range, at which amorphous materials such as polymers transition between a hard, brittle, glassy state to a molten, rubbery state. $T_g$ is usually expressed as a singular value when the transition between the glassy state and the rubbery state reaches 100%. When the polymer is cooled below the $T_g$, it becomes hard and rigid. Above the $T_g$, the mobility of the polymer chains increase significantly and the polymer assumes a more pliable nature. A glass transition temperature is often measured as the energy released on heating by the differential scanning calorimetry (DSC) technique.

The present disclosure provides a process for recovering hydrocarbon from a petroleum reservoir. The hydrocarbon contains primarily crude oil but natural gas is also often present. While this process can be applied to both sandstone and carbonate reservoirs, the advantages of the process can be best manifested when used on carbonate reservoirs with low permeability. This process is designed to supplement primary (natural) and secondary recoveries, and includes an initial flooding of a carbonate reservoir with 1-3 pore volumes (PVs) of water which may be natural sea water, fresh water, produced water, aquifer water, river water, artificial saline water or brine (waterflooding), followed by at least a single injection of the same or different water that contains and carries a plurality of citric acid-filled microcapsules. The amount of the citric acid microcapsule dispersion injected is 1-5 pore volumes, preferably 2-5 pore volumes, more preferably 2-4 pore volumes. After an incubation period, the carbonate reservoir is flushed again with up to 10 pore volumes of the water without the microcapsules. The initial waterflooding recovers up to 60% of a reservoir's original oil in place, preferably 5-60%, more preferably 10-50%, even more preferably 20-40%. The final waterflooding that ensues flushing of the reservoir with citric acid microcapsules and the incubation recovers a further 10-35% of the reservoir's original oil in place. Hence, the oil recovery process provided by the present disclosure recovers up to 90% of the original oil in place of a reservoir, preferably 15-90%, more preferably 45-90%, more preferably 55-90%, even more preferably 60-85%, most preferably 65-80%. In this process, contrary to known acid treatment methods of the wellbore region, the citric acid-filled microcapsules are injected deep into the oil reservoir.

Injection flow rates of the initial waterflooding, citric acid microcapsule dispersion and final waterflooding can be kept constant or varied, but are no higher than 250 L/s or 0.25 m³/s, preferably 5-200 L/s, more preferably 10-150 L/s, even more preferably 50-100 L/s.

Injection pressures of the initial waterflooding, citric acid microcapsule dispersion and final waterflooding can also be kept constant or varied, but are no higher than 10,000 psi, preferably 1,000-10,000 psi, more preferably 2,500-8,500 psi, even more preferably 5,000-7,500 psi.

The citric acid microcapsule dispersion has a capsule density of $10^4$-$10^{12}$/L, preferably $10^5$-$10^{10}$/L, more preferably $10^6$-$10^8$/L. Factors determining the capsule density include capsule size and amount of in situ generated $CO_2$ required to effectively reduce oil viscosity and move the oil.

Advantageously, directional drilling is practiced in well-drilling operations preceding the oil recovery the production well. In particular, the reservoir rock formations are drilled horizontally to create at least one horizontal or lateral passage across the reservoir. The horizontal orientation of the reservoir well is configured to maximize contact between the citric acid microcapsules and the formations. The oil well system at an oil field typically includes at least one injection/injector well through which fluids and citric acid microcapsule dispersion are delivered to the reservoir and at least one production well through which displaced oil is brought to the earth surface. Certain portions or the entireties of these wells may also be non-vertical, i.e. slant or horizontal.

Once placed deep inside the oil reservoir, the citric acid microcapsules are left to incubate in the natural reservoir temperature which will trigger breakdown of the capsules to release the citric acid. The injected water protects the microcapsules against mechanical forces and shear stress so that they do not prematurely break down before they are placed deep inside the reservoir. Additionally, the injected water acts as a medium for transporting the microcapsules to infiltrate the reservoir rock formations and seep through the formation pores. The released citric acid will form a citric acid solution with the injected water. The formed citric acid solution contacts and reacts with the calcium carbonate that is found in abundance in carbonate reservoir rocks to generate $CO_2$, in situ, at the reservoir:

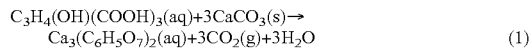

(1)

In other words, citric acid acts as a $CO_2$ precursor. The $CO_2$ generated has limited mobility as it is generated and is therefore contained by the rock formations. The $CO_2$ generated encounters the residual oil trapped within the rock formations of the reservoir, causes the oil to swell, reduce in viscosity and move towards to a nearby production well.

Reservoir temperature is primarily governed by the reservoir's proximity to the earth's mantle, and by the relative heat exchange capacities and thermal conductivities of the formations forming the lithostatic sequence that includes the reservoir. The reservoir temperature typically ranges from 50-120° C., with an average temperature of 75-85° C. The citric acid microcapsules are incubated for at least 12 h, preferably 12-36 h, more preferably 18-30 h, even more preferably 20-28 h, most preferably 22-26 h.

In FIG. 1, a curve representing oil recovery trend from a coreflooding simulation is shown. The Indiana limestone core used in the simulation has a core length of 6 in, an initial porosity of 0.15 or 15%, and an initial permeability of 10.8 md. The fluid injection rate is kept constant at 0.25 cc/min. The core is injected with 2 pore volumes of sea water, which results in ~60% of the original oil in place being recovered. Then, the core is injected with 2 pore volumes of sea water with dispersed citric microcapsules and the core is left to soak in the dispersion for 24 h at 100° C. After that, the core is flushed with 3 pore volumes of sea water where a further ~25% of the core's original oil in place is extracted.

Figure 2:
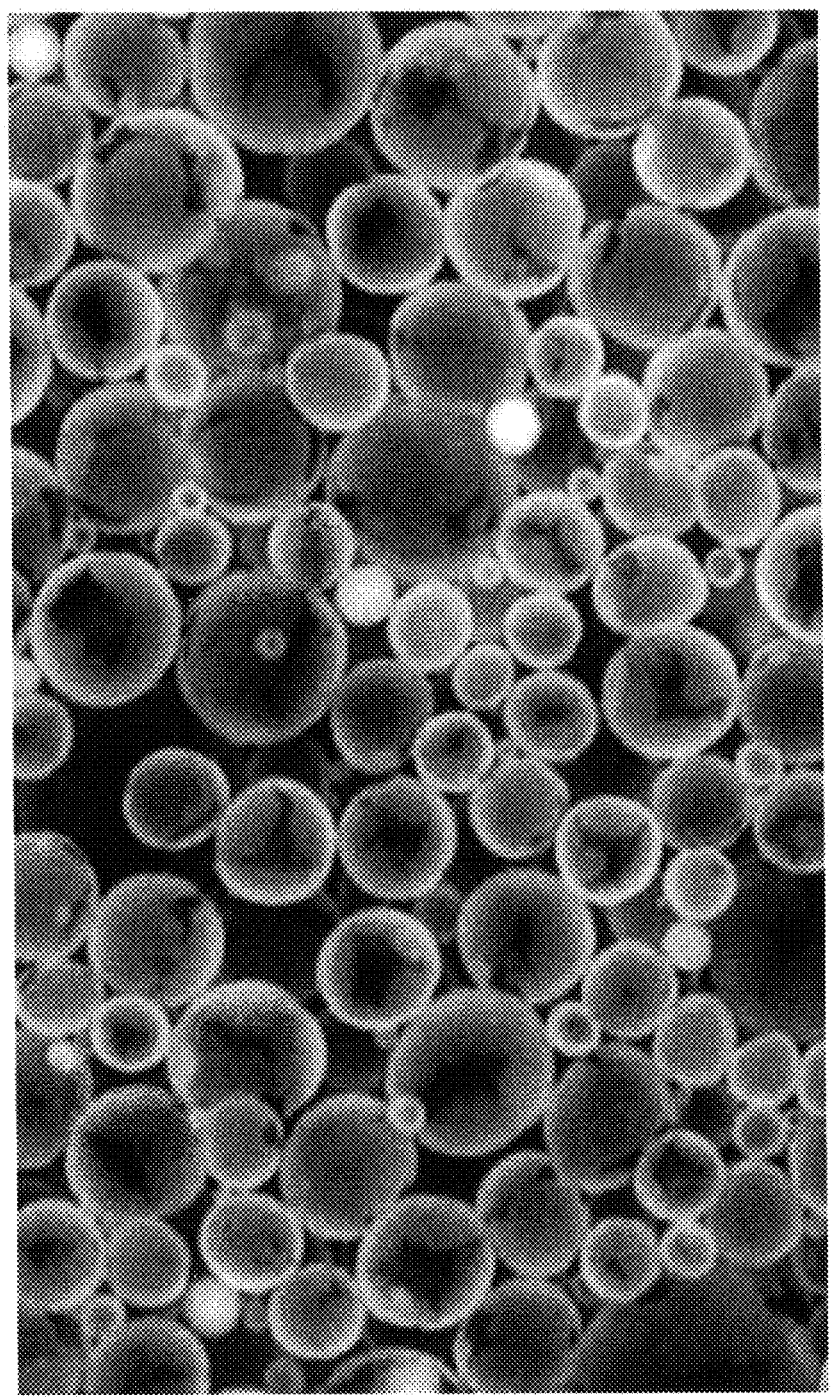
FIG. 2 is a micrograph showing encapsulated citric acid.

An image of citric acid-filled microcapsules according to one embodiment, as acquired by scanning electron microscopy (SEM) is presented in FIG. 2. A citric acid-filled microcapsule is composed of an outer polymeric shell whose non-porous wall defines the shape and size of the microcapsule, and an inner, encapsulated solid core material comprising citric acid. The encapsulated citric acid is in a non-reactive solid form, such as powder or pellet, which, once released from a thermally degraded microcapsule shell, dissolves readily in the water injected during the waterflooding step to form a reactive citric acid solution. The non-reactive citric acid solid can be anhydrous or hydrated (i.e. monohydrate). The amount of citric acid solid contained in a microcapsule is 1-20% by weight per total weight of a filled microcapsule, preferably 1-15%, more preferably 2-10%. In certain embodiments, the microcapsule further contains one or more chelating agents, also in solid form, at a concentration of 1-20% by weight per total weight of a microcapsule, preferably 1-15%, more preferably 2-10%. The one or more chelating agents are selected from ethylenediaminetetracetic acid (EDTA), (hydroxyethyl)ethylenediaminetriacetic acid (HEDTA), glutamic acid-N,N-diacetic acid (GLDA), methylglycine-N,N-diacetic acid (MGDA), nitrilotriacetic acid (NTA), hydroxyethyliminodiacetic acid (HEIDA), iminodisuccinic acid (IDS), polyaspartic acid and ethylenediamine-N,N-disuccinic acid (EDDS). In alternative embodiments, the encapsulated citric acid may be mixed or substituted with one or more of other weak organic acids that can react with calcium carbonate to generate $CO_2$, which include but are not limited to formic acid, acetic acid, propionic acid, butyric acid, valeric acid, caproic acid, oxalic acid, lactic acid, malic acid, benzoic acid and carbonic acid.

The polymeric shell has a wall thickness that is preferably no greater than 2 μm or 2000 nm, preferably 25-1000 nm, more preferably 50-750 nm, even more preferably 100-500 nm, so that the wall can rupture easily to release the citric acid content when subjected to the reservoir high temperatures. In one embodiment, the microcapsule is of a generally spherical or round shape having a diameter range of 0.1-50 μm, preferably 0.2-20 μm, 0.5-20 μm, 1.0-20 μm, 5-20 μm, 10-20 μm, 15-20 μm, more preferably 0.1-10 μm, 0.1-5.0 μm, 0.2-5.0 μm, even more preferably 0.1-2.0 μm, 0.2-2.0 μm, 0.5-2.0 μm, 1.0-2.0 μm, most preferably 0.1-1.0 μm, 0.2-1.0 μm, 0.1-0.5 μm, 0.2-0.5 μm. In another embodiment, the microcapsule is oval or rod-shaped where the large diameter (for the oval) or length (for the rod) ranges from 0.5-75 µm, preferably 1.0-60 µm, 5.0-50 µm, more preferably 7.5-30 µm, 10-30 µm, 10-25 µm, 15-25 µm while the small diameter or width is ranged from 0.05-20 µm, preferably 0.1-10 µm, more preferably 0.1-5.0 µm, 0.2-5.0 µm, 0.5-5.0 µm, 0.1-2.5 µm, 0.2-2.5 µm, 0.5-2.5 µm. Generally, if a targeted reservoir has low permeability, the oil recovery process in accordance with the present disclosure would require the citric microcapsules to have a smaller size. The microcapsule can also assume other common shapes such as oblong, bullet, tubular and even less common geometrical shapes like square, rectangular, triangular and cylindrical.

To avoid adding undesirable impurities to the extracted hydrocarbon, the polymeric microcapsule shell is advantageously free of elements such as but not limited to silicon, phosphorus, fluorine, bromine, chlorine and sulfur. Acceptable elements of the polymer include carbon, hydrogen, oxygen and nitrogen.

To accelerate the degradation rate of a capsule, the polymeric shell is advantageously free of chemical crosslinking agents. As used herein, "chemical crosslinkers" or "chemical crosslinking agents" are molecules that form thermally stable covalent bonds or chemical crosslinks with two or more polymer chains in a polymer, to link one polymer chain to another, in order to promote mechanical strength and thermal stability of the polymer. Examples of crosslinkers commonly used in manufacturing of polymers include 4-vinylbenzocyclobutene, trimethylolpropane ethoxylate, triethylene glycol dimethacrylate, poly(ethylene glycol) diacrylate, poly(ethylene glycol) bisazide, 1,4-phenylenediacryloyl chloride, pentaerythritol propoxylate, pentaerythritol ethoxylate, 1,1-maleimidoundecanoic acid, hexa (ethylene glycol) dithiol, glycerol ethoxylate, p-divinylbenzene, divinylbenzene, 1,4-bis(4-vinylphenoxy) butane and bis(2-methacryloyl)oxyethyl disulfide. Molecules that form heat-reversible physical crosslinks such as hydrogen bonds between polymer chains may be acceptable to incorporate into the polymeric microcapsule shell, but are not required.

The polymeric microcapsule shell is hydrophobic and water-insoluble, or has limited water solubility at temperatures that are lower than reservoir temperature.

The citric acid filled-microcapsules of the present disclosure can be prepared by any known fabrication technique suitable for microencapsulation of solids, and is not so limited. These manufacturing techniques include but are not limited to pan coating, air-suspension coating, fluid-bed coating, spray-drying and congealing, emulsion polymerization, in situ polymerization, matrix polymerization, layer-by-layer assembly, coacervation and phase separation, solvent evaporation, interfacial polycondensation, interfacial crosslinking, centrifugal extrusion, and vibrational nozzle [Ghosh, S. K. (Editor), Functional Coatings: By Polymer Microencapsulation. Wiley, July 2006. ISBN: 978-3-527-31296-2; Jyothi, N. V. N, Prasanna, P. M., Sakarkar, S. N., Prabha, K. S., Ramaiah, P. S., Srawan, G. Y. Microencapsulation Techniques, Factors Influencing Encapsulation Efficiency. *Journal of Microencapsulation*, 2010, 27(3):187-197—each incorporated herein by reference in its entirety].

The following paragraphs further describe different strategies adopted in the present disclosure to ensure that the capsule-enclosed citric acid is selectively released inside the reservoir and not prematurely in the injection well. Importantly, the microcapsule shell is able to withstand the geothermal gradient and shear stress across the injection well, as well as the injection pressure.

In one or more embodiments, in addition to the aforementioned polymer properties and characteristics, the polymeric microcapsule shell is a homo- or copolymer whose glass transition temperature falls within ±10° C. of the average temperature of a targeted oil reservoir temperature range of 50–120° C., preferably ±8° C., more preferably ±5° C. For example, if a targeted reservoir has an average temperature of 80° C., the polymer constituting the microcapsule shell would have a glass transition temperature of 70-90° C., so that, when subjected to the reservoir temperature, the polymeric shell transitions from an ordered crystalline or semi-crystalline structure to an amorphous state. While in an amorphous state, where polymer chains are randomly oriented, the shell at least partially loses its mechanical strength, collapses and releases the encapsulated citric acid. Referring to the present example, homopolymers having a glass transition temperature of 70-90° C. and satisfying the other criteria of being free of sulfur, silicon, phosphorus, halogens and chemical crosslinkers include but are not limited to poly(tert-butyl acrylate), poly(tert-butyl vinyl ether), poly(cyclohexyl methacrylate), poly(cyclohexyl vinyl ether), poly(4-ethoxystyrene), poly(ethylene terephthalate), poly(2-hydroxypropyl methacrylate), polyindene, poly(isopropyl methacrylate), poly(phenylene vinylene), poly(phenyl vinyl ketone), poly(vinyl pivalate) and poly(vinyl cyclohexanoate). The specific glass transition temperature values of these homopolymers are given in Table 1.

TABLE 1

Glass transition temperatures ($T_g$) of homopolymers.

| Homopolymer | $T_g$ (° C.) |
|---|---|
| Poly(tert-butyl acrylate) | 43-107 |
| Poly(tert-butyl vinyl ether) | 88 |
| Poly(cyclohexyl methacrylate) | 92 |
| Poly(cyclohexyl vinyl ether) | 81 |
| Poly(4-ethoxystyrene) | 86 |
| Poly(ethylene terephthalate) | 72 |
| Poly(2-hydroxypropyl methacrylate) | 76 |
| Polyindene | 85 |
| Poly(isopropyl methacrylate) | 81 |
| Poly(phenylene vinylene) | 80 |
| Poly(phenyl vinyl ketone) | 74 |
| Poly(vinyl pivalate) | 86 |
| Poly(vinyl cyclohexanoate) | 76 |

In some embodiments, further to being water insoluble, as well as sulfur, silicon, phosphorus, halogen and crosslinker-free, the polymeric microcapsule shell is constructed of a homo- or copolymer where the repeating units or monomers are connected by non-carbon-carbon covalent bonds that tend to have a lower thermostability, including but are not limited to ester linkages, amide linkages and glycosidic linkages. Such a microcapsule shell is susceptible to thermal decomposition or pyrolysis when exposed to the elevated temperatures of a reservoir, as the aforementioned covalent linkages are cleaved to release the encapsulated citric acid. Examples of homopolymers or copolymers having ester/amide/glycoside linkages include but are not limited to polyglycolide or polyglycolic acid, polylactic acid, polycaprolactone, polyhydroxyalkanoates (e.g. polyhydroxybutyrate), polyethylene adipate, polybutylene succinate, poly (3-hydroxybutyrate-co-3-hydroxyvalerate), polyethylene terephthalate, polybutylene terephthalate, polytrimethylene terephthalate, polyethylene naphthalate (polyesters), cellulose, cellulose nitrate, cellulose acetate, cellulose diacetate, cellulose triacetate, polycarbonates and polyamides. In Table 2, chemical structures of the repeating units of a variety of exemplary polyesters, cellulose-based polymers, polycarbonates and polyamides are provided.

TABLE 2

Polymers having ester, glycosidic or amide linkages.

| Polymer class | Examples | Repeating unit | Linkage between repeating units |
|---|---|---|---|
| Polyester | Polyglycolide or polyglycolic acid | [structure] | Ester |
| | Polylactic acid | [structure] | |
| | Polycaprolactone | [structure] | |
| | Polyhydroxyalkanoates, e.g. polyhydroxybutyrate | [structure] | |
| | Polyethylene adipate | [structure] | |
| | Polybutylene succinate | [structure] | |
| | Poly(3-hydroxybutyrate-co-3-hydroxyvalerate) | [structure] | |
| | Polyethylene terephthalate | [structure] | |
| | Polybutylene terephthalate | [structure] | |
| | Polytrimethylene terephthalate | [structure] | |

TABLE 2-continued

Polymers having ester, glycosidic or amide linkages.

| Polymer class | Examples | Repeating unit | Linkage between repeating units |
|---|---|---|---|
| | Polyethylene naphthalate | [structure shown] | |
| Polysaccharide or cellulose-based | Cellulose, Ethyl cellulose, Cellulose acetate, Cellulose diacetate, Cellulose triacetate, Cellulose nitrate | Cellulose: [structure shown] | Glycosidic |
| Polycarbonate | Bisphenol A, Bisphenol A terephthalate, Bisphenol A carbonate, Bisphenol F, Bisphenol F carbonate, Bisphenol Z, Bisphenol Z carbonate | Bisphenol A: [structure shown] | Ester |
| Polyamide | Polyamide 6, Polyamide 6, 6 | Polyamide 6: [structure shown] | Amide |

In view of the above, it is apparent that heat, specifically an oil reservoir heat, is the main environmental factor inducing release of citric acid from the microcapsules, where the polymeric shell undergoes thermal physical degradation, thermal decomposition, or both. The citric acid microcapsules can also be additionally triggered by other mechanisms such as pressure, shear stress, pH and thermal hydrolysis. For example, while oil reservoirs usually have a pH value of 7 or a near-neutral pH, some reservoirs can be acidic or basic. Microcapsules having pH-responsive polymeric shells can be placed in a reservoir having the same acidity or alkalinity where the shells collapse and release the enclosed citric acid. pH-responsive polymers are those that contain an acidic group or a basic in their repeating units, such as polylactic acid and polyamides.

The present disclosure relates to a process for recovering oil from a sandstone reservoir. When targeting a sandstone reservoir, the reservoir is initially flooded with a fluid (i.e. natural sea water, fresh water, produced water, aquifer water, river water, artificial saline water or brine), then the same or a different fluid containing and carrying a plurality of microcapsules filled with a mixture of citric acid and calcium carbonate in solid form, i.e. 1-20% of citric acid per total weight of the microcapsule, preferably 1-15%, more preferably 2-10% and 3-60% of calcium carbonate per total weight of the microcapsule, preferably 5-50%, more preferably 10-45%. The sandstone reservoir is then left to soak in the microcapsule dispersion for a predetermined period to allow rupture of the polymeric microcapsule shells and release of the encapsulated citric acid and calcium carbonate. The citric acid and the calcium carbonate react with each other to generate $CO_2$ in situ at the reservoir. After that, the sandstone reservoir is flushed again with the fluid without any microcapsule. Parameters such as amount of fluid/dispersion injected, incubation period, injection flow rate and capsule density are as described for the oil recovery process from a sandstone reservoir.

The present disclosure is further illustrated by the following examples showing and comparing recovery efficiencies of different oil recovery processes and interfacial tension values of oil when encapsulated citric acid or non-encapsulated citric acid is used in oil recovery. These examples are not intended to limit the scope of the invention including the appended claims.

Example 1

Figure 3:
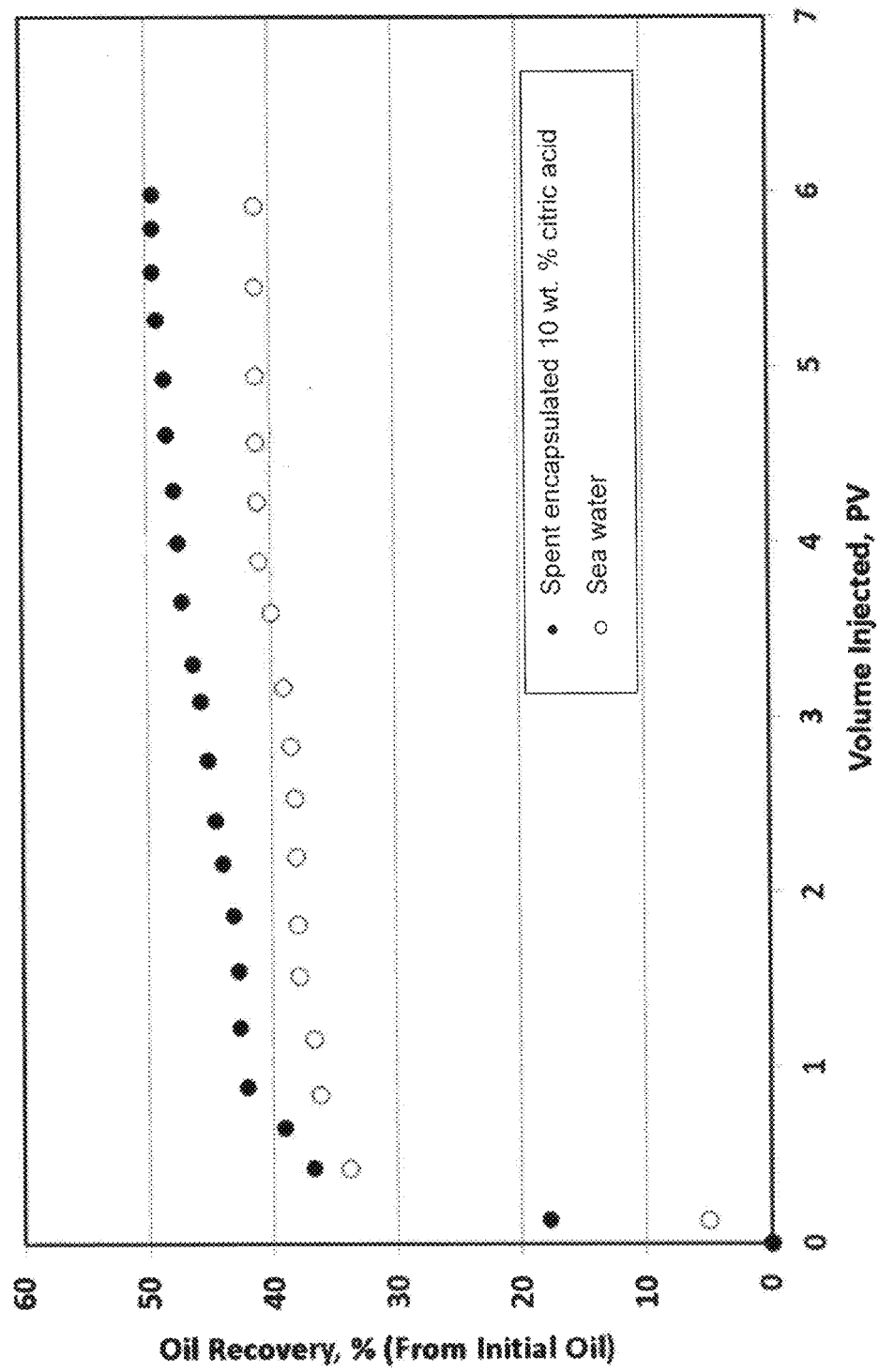
FIG. 3 shows and compares oil recovery efficiencies of two processes: a process where only sea water is injected and a process where 10 wt. % citric acid microcapsules are injected.

Referring to FIG. 3, where oil recovery efficiencies of two processes are shown and compared. In the first process, 6 pore volumes of sea water are injected into a carbonate reservoir to displace oil. In the second process, 6 pore volumes of sea water carrying 10 wt. % citric acid microcapsules are injected into the same carbonate reservoir. The first process utilizing only sea water recovers ~42% of the original oil in place while the second process utilizing sea water and 10 wt. citric acid microcapsules recovers ~50% of the original oil in place.

Example 2

Figure 4:
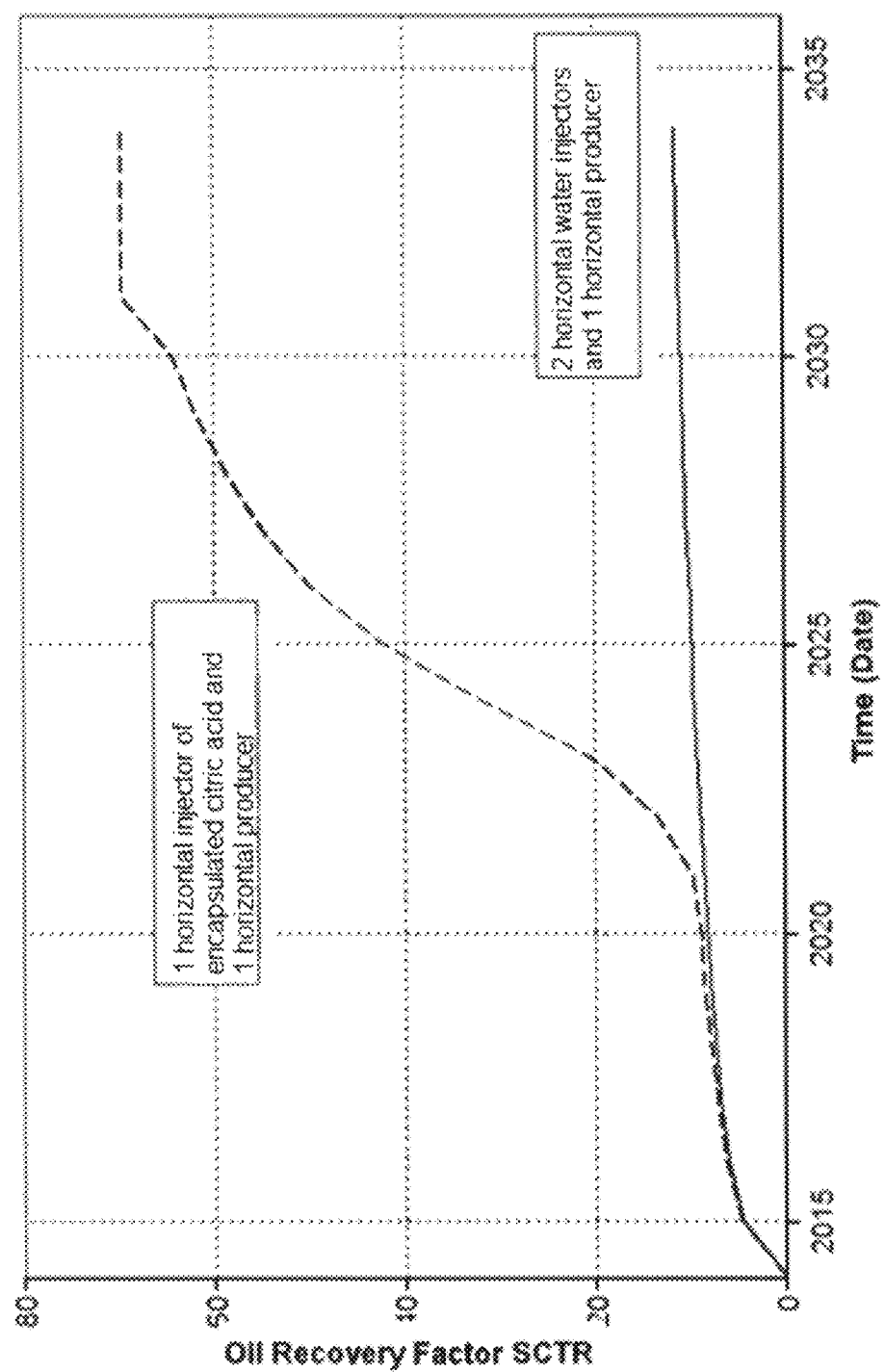
FIG. 4 shows simulated oil recovery factor SCTR versus time in years of two oil recovery processes from a water-drive carbonate reservoir.

Referring to FIG. 4, where simulated oil recovery factor SCTR versus time in years from an industrial scale waterdrive carbonate reservoir is shown. Waterdrive petroleum reservoirs are characteristically bounded by and in communication with aquifers. The solid line represents use of two horizontal water injectors and a horizontal production well. The dotted line represents use of one horizontal injector of encapsulated citric acid and a horizontal production well. The data was generated using CMG's STARS thermal simulator.

As shown in FIG. 4, for the initial five years, the recovery factors are more or less equal for water and encapsulated citric acid injection, but continuous injection of encapsulated citric acid results in more recovery in subsequent years as other mechanisms besides displacement sweep, i.e. slow release of citric acid and in situ generation of $CO_2$ in the reservoir causes the oil viscosity reduction and increases its mobility. All the injector wells are drilled in the aquifer and in the oil zone. The citric acid microcapsules will sill be placed in the reservoir through horizontal wells and then allowed to degrade, release citric acid which reacts carbonate rocks to generate $CO_2$.

Example 3

Figure 5:
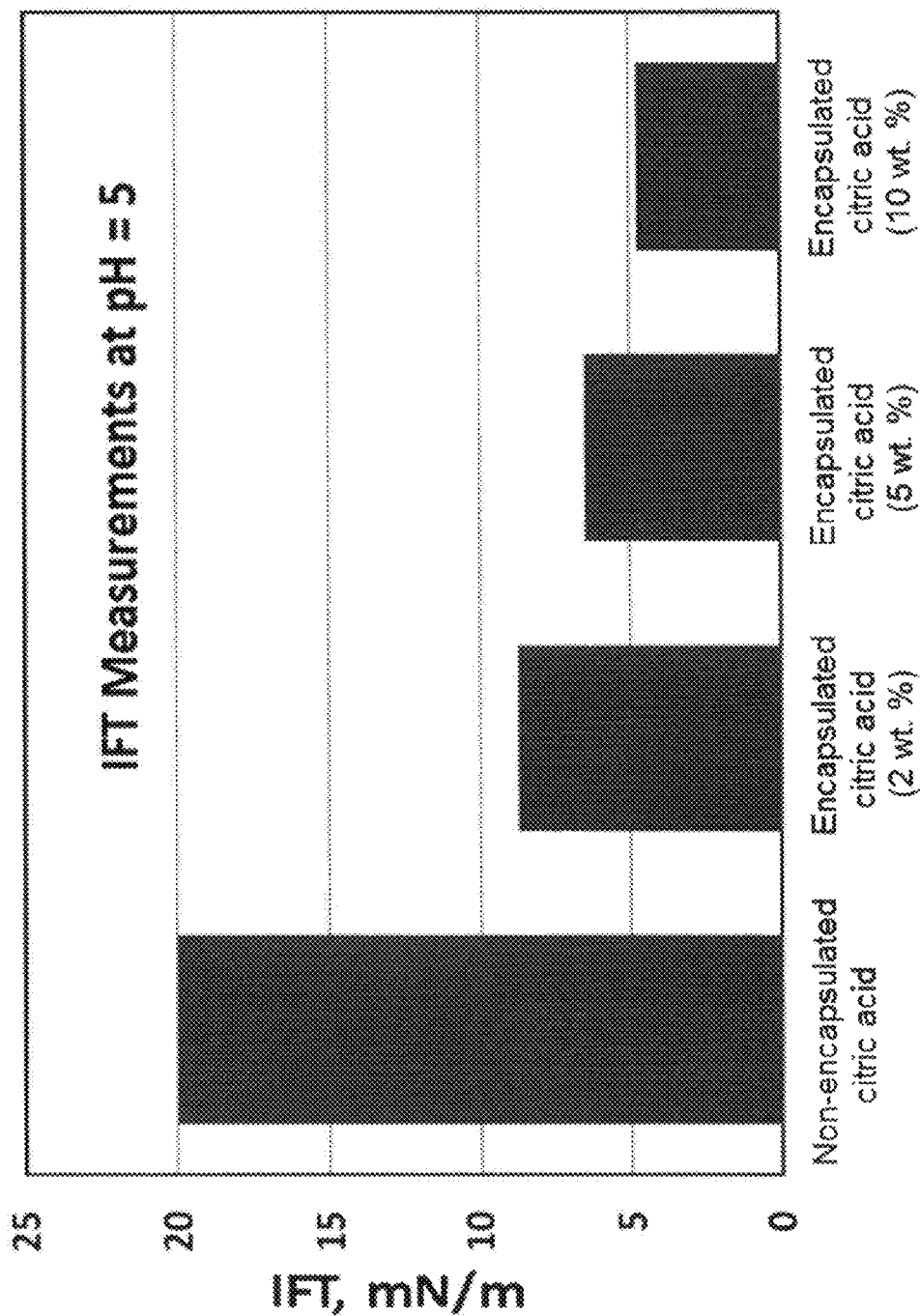
FIG. 5 is a bar graph showing interfacial tension reduction of residual oil by encapsulated and non-encapsulated spent citric acid.

Referring to FIG. 5, where measured interfacial tension (IFT) values of oil when encapsulated citric acid (2 wt. %, 5 wt. %, 10 wt. %) or non-encapsulated citric acid is used in oil recovery are presented. A lower IFT value indicates lower oil viscosity. It is apparent from this figure that use of encapsulated citric acid results in the oil having lower viscosity. Higher concentrations of encapsulated citric acid lead to even lower oil viscosity.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A high pressure capsule-injection process for recovering hydrocarbons from a carbonate reservoir having a plurality of carbonate geologic formations, the process comprising:
   directionally drilling into the carbonate reservoir to create at least one horizontal or lateral passage across the carbonate reservoir,
   flooding the carbonate reservoir through the horizontal or lateral passage with a first fluid thereby displacing and recovering a first portion of the hydrocarbons, wherein the carbonate reservoir has a permeability not higher than 10 and the first fluid is seawater, and wherein the flooding comprises injecting the first fluid in to the carbonate reservoir at a pressure of 1,000-7,500 psi; then
   injecting a dispersion into the carbonate reservoir, the dispersion consisting of seawater and a plurality of citric acid-filled capsules having an average diameter in a range of from 0.1 to 50 μm, wherein the capsules comprise an outer polymeric shell consisting of a water insoluble polyglycolide that is free of a chemical cross-linker, silicon, phosphorus, fluorine, bromine, chlorine and sulfur; then
   incubating the dispersion in the carbonate reservoir for at least 12 h; and then
   flooding the carbonate reservoir with a third fluid thereby displacing and recovering a second portion of the hydrocarbons, wherein the third fluid is seawater;
   wherein during the incubating:
      the dispersion infiltrates the plurality of carbonate geologic formations;
      the plurality of citric acid-filled capsules undergoes thermal degradation and releases the citric acid;
      the released citric acid reacts with the plurality of carbonate geologic formations to generate carbon dioxide at the plurality of carbonate geologic formations; and
      the generated carbon dioxide contacts the second portion of the hydrocarbons, thereby making the second portion of the hydrocarbons swell and reducing a viscosity of the second portion of the hydrocarbons.

2. The process of claim 1, further comprising:
   recovering up to 60% of original oil in place in the carbonate reservoir during the flooding with the first fluid; and
   recovering a further from 10% to 35% of original oil in place in the carbonate reservoir during the flooding with the third fluid.

3. The process of claim 1, wherein the outer polymeric shell is non-porous, and no greater than 2 μm in thickness.

4. The process of claim 1, wherein the capsule comprises an inner solid core material that comprises from 1% to 20% of citric acid per total weight of the capsule.

5. The process of claim 1, wherein the inner solid core material further comprises from 1% to 20% of one or more chelating agents per total weight of the citric acid-filled capsule, the one or more chelating agents being selected from the group consisting of (hydroxyethyl)ethylenediaminetriacetic acid (HEDTA), glutamic acid-N,N-diacetic acid (GLDA), methylglycine-N,N-diacetic acid (MGDA), nitrilotriacetic acid (NTA), hydroxyethyliminodiacetic acid (HEIDA), iminodisuccinic acid (IDS), polyaspartic acid and ethylenediamine-N,N-disuccinic acid (EDDS).

6. The process of claim 1, wherein the dispersion has a density of from $10^4$ to $10^{12}$ citric acid-filled capsules per liter of the seawater.

7. The process of claim 1, wherein the permeability is from 0.05 to 10 md.

* * * * *